March 15, 1938. J. B. PICARD 2,111,514
BELT TIGHTENER
Filed Dec. 11, 1935 3 Sheets-Sheet 1

INVENTOR.
John B. Picard,
BY Edward A. Lawrence
his ATTORNEY.

March 15, 1938.  J. B. PICARD  2,111,514
BELT TIGHTENER
Filed Dec. 11, 1935  3 Sheets-Sheet 2
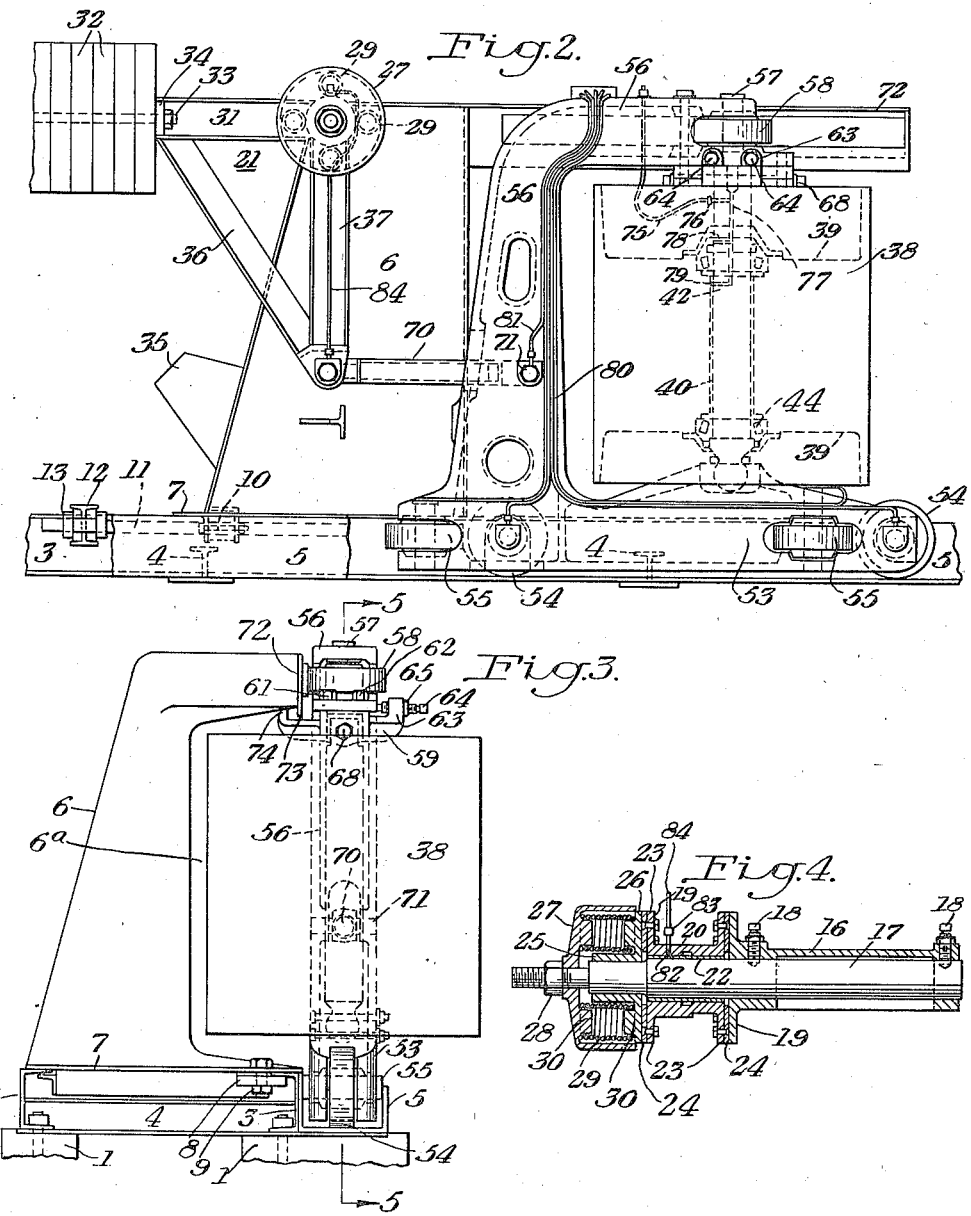
INVENTOR.
John B Picard,
BY Edward A Lawrence
his ATTORNEY.

March 15, 1938.                J. B. PICARD                2,111,514
                              BELT TIGHTENER
                           Filed Dec. 11, 1935            3 Sheets-Sheet 3
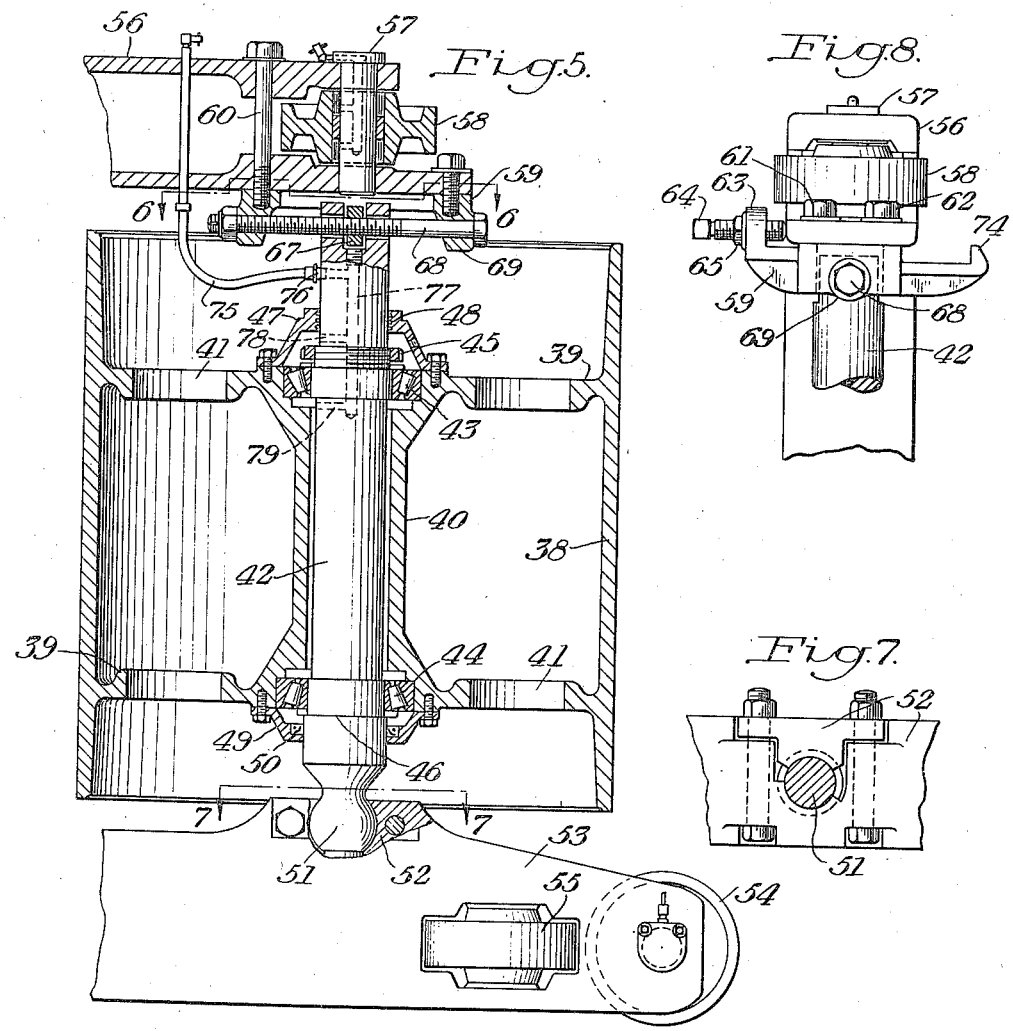
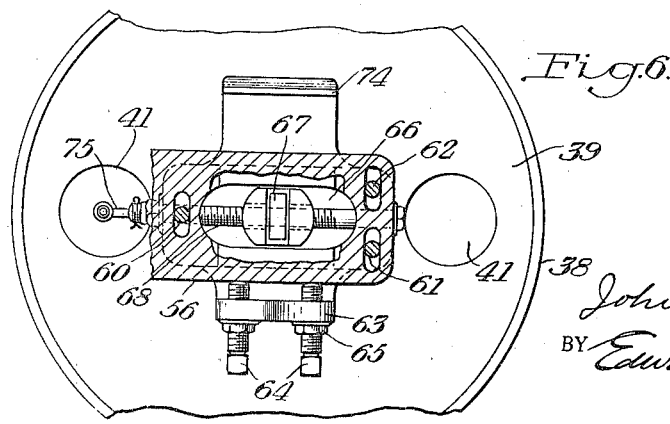
INVENTOR.
John B. Picard
BY Edward A. Lawrence
his ATTORNEY.

Patented Mar. 15, 1938

2,111,514

UNITED STATES PATENT OFFICE 2,111,514

BELT TIGHTENER

John B. Picard, Toledo, Ohio, assignor to The National Supply Company, Pittsburgh, Pa., a corporation of Pennsylvania Application December 11, 1935, Serial No. 53,843

5 Claims. (Cl. 74—242.11)

My invention relates to automatic belt tighteners for taking up the slack in and maintaining proper tension upon an endless belt.

More particularly it relates to the type of belt tightener wherein the belt-engaging pulley is carried by a movably mounted support and is urged against the run of the belt, as by a counterweight device.

In the present practice the belt-engaging pulley is usually mounted on an axial spindle or shaft which is supported at one end only, thus forming what is in effect a cantilever structure which tends to bind the pulley.

In my invention I support the axial member of the pulley at both ends.

In the preferred embodiment of my invention I provide a track or guide parallel to the path of movement of the pulley carriage and along which the upper end of the axial member of the pulley is movable in response to the travel of the belt.

Such track or guide may be stationary and supported from the base, but for practical reasons I prefer to support the track or guide from the counterweight device.

I also provide means for adjusting the axis of the pulley relative to the vertical so that it will properly engage the belt for the full width of the latter, thus maintaining the belt flat and preventing slippage of the latter longitudinally of the pulley.

Again, due to the freedom of movement of the pulley carriage, vibrations of lesser amplitude tend to be transmitted from the carriage to the counterweight device, and to result in objectionable oscillation of the counterweight. To overcome this fault, I provide means for dampening out this oscillation, which is due to minor vibrations of the pulley carriage.

I further provide means for adjusting the position of the counterweight device relative to the base of the mechanism, and also means for varying or changing the limit of said adjustment.

Other novel features of construction, and also of arrangement of parts will appear from the following description.

In the accompanying drawings, wherein I have illustrated a practical embodiment of the principles of my invention, Fig. 1 is a top plan view.

Fig. 2 is a side elevation.

Fig. 3 is an end view of the belt pulley and the counterbalance support looking from the left in Fig. 2.

Fig. 4 is a sectional view taken along the line 4—4 in Fig. 2 showing the means for dampening the oscillations of the counterbalance.

Fig. 5 is a sectional view taken on the line 5—5 in Fig. 3 showing the structure and mounting of the belt pulley.

Fig. 6 is a horizontal section taken along the irregular line 6—6 in Fig. 5.

Fig. 7 is a horizontal section taken on the line 7—7 of Fig. 5.

Fig. 8 is an enlarged detail view of the pulley adjusting mechanism.

Figure 1:
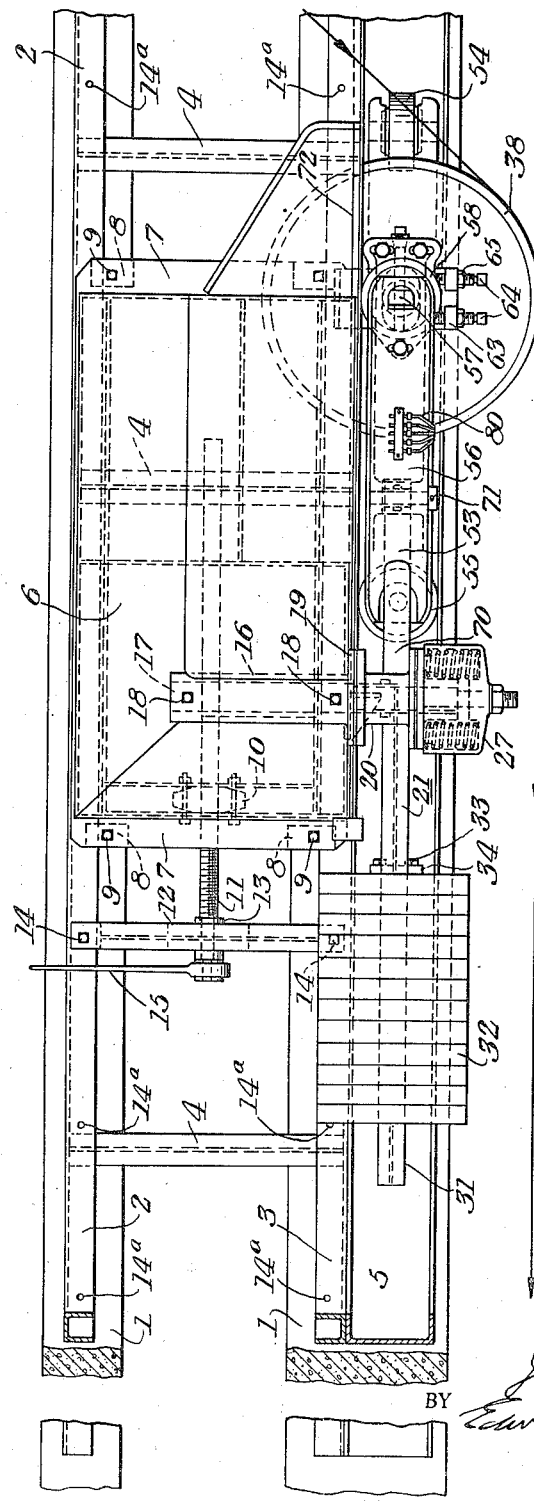

Referring to the drawings, 1 represents the two parallel supports or foundations which form the bed of the mechanism upon which are mounted the parallel rails 2 and 3, preferably of channel shape with their troughs or interiors facing each other. The rails 2 and 3 are held in rigid spaced relation as by the cross members 4. 5 represents a third rail which is outside of and parallel to the channel rail 3. The rail 5 is also of channel shape but with its flanges extending upwardly.

6 represents the counterbalance support which is shown as an inclosed housing, made of steel plates and which is mounted on the rails 2 and 3 and is movable along the same for the purpose of adjustment. At either end the support 6 is provided with a horizontally extending foot flange 7 which rides on the top flanges of the rails 2 and 3. 8 represents plates arranged to underlie the top flanges of the rails 2 and 3, and which are clamped tightly against the rail flanges by the bolts 9 which extend through the flanges 7 and the said plates. Thus by tightening the bolts 9 the counterbalance support 6 may be clamped in fixed position on the rails 2 and 3, but when the bolts 9 are loosened the counterbalance support may be shifted along the rails.

I provide means for moving the support 6 along the rails. Thus 10 represents an adjusting screw nut fixed in the lower portion of the support 6, and 11 represents a screw shaft extending longitudinally between the rails 2 and 3 and screwed in said nut. The screw shaft is journaled in bearings carried by a cross bar 12, and is held against longitudinal movement relative to said cross bar as by the collars 13 on the screw shaft. Said cross bar spans the rails 2 and 3 and is held in fixed relation to the rails by the bolts 14 which extend through holes 14a in the upper flanges of the rails 2 and 3. By providing a series of such holes 14a longitudinally of the rails the position of the cross bar may be shifted, thus moving the screw shaft longitudinally.

One protruding end of the shaft 11 is arranged for the application of a ratchet wrench 15 or other tool to rotate the screw shaft and thus move the support 6 in the desired direction on the rails.

Thus the counterweight support may be adjusted longitudinally of the rails. In case further adjustments beyond the effective length of the screw shaft 11 is desired, the bolts 14 may be removed and the cross bar 12 may be shifted to a new position relative to the rails, thus providing for a new limit of the screw shaft adjustment.

The upper portion of the support 6 is provided with a transversely disposed sleeve 16 in which is inserted the shaft 17, means, such as the set screws 18, being provided to hold the shaft against rotary and axial movement relative to the sleeve.

One end of the sleeve 16 is provided with a radially extended annular flange 19.

The shaft 17 extends beyond the flange 19 and has rotatably mounted thereon the hub 20 of the bell crank frame 21. 22 is a bronze bushing interposed between the hub and the shaft. The hub is provided at its ends with the radially extended annular flanges 23 which are provided with friction facings 24. 25 represents a short sleeve slidably mounted on the shaft 17 outside the hub 20 and which is provided on its inner end with the radially extended annular flange 26. 27 represents a cup-like spring-housing which overlies the sleeve 25 and is provided with an axial opening in its head through which extends the reduced extremity of the shaft 17, the said extremity being threaded to receive a nut or nuts 28. 29 represents a plurality of helical springs within the housing 27 and arranged in annular series about the sleeve 25, the head of the housing and the flange being provided with circular projections 30 which engage in the ends of the springs and hold them in place.

The flanges 23 of the hub 20 are in frictional engagement with the stationary flanges 19 and 26, and the friction is regulated by adjustment of the nut 28, and thus the rotary movements of the hub 20 and the bell crank frame 21 may be dampened to the desired degree.

The rearwardly extending arm 31 of the bell crank frame 21 is arranged to receive the weight members 32 which are apertured to be slidably mounted on said arm and which are detachably secured thereon by the through bolts 33 which extend through ears 34 on the arm and through registering holes in the weight members.

The downward movement of the weighted arm 31 is limited by the abutment bracket 35 mounted on the housing 6 and in the path of movement of the diagonal brace 36 of the bell crank frame. 37 represents the depending arm of the bell crank frame.

The front of the support 6 is provided with a reentrant portion 6a to provide clearance for the belt-pulley 38, as shown in Figs. 1 and 3.

The pulley 38 is formed with inset ends 39 which are connected by the axial hub 40. The ends are preferably provided with a circumferentially disposed series of apertures 41 to save metal and weight.

The belt pulley is rotatably mounted on the spindle 42 upon which the hub 40 fits loosely, the upper and lower ends of the hub being enlarged and recessed to accommodate the upper and lower anti-friction bearing assemblies 43 and 44.

The spindle 42 is threaded to receive a hold-down nut 45 to hold the top bearing assembly 43 in place, and is also provided with a shoulder 46 to support the lower bearing assembly 44.

47 represents a frusto-conical ring mounted on the upper end of the hub 40 and having an axial hole, provided with labyrinth grooves 48 through which the spindle extends.

49 represents a frusto-conical ring depending from the hub and carrying an oil-sealing ring 50 which surrounds the spindle.

The lower end of the spindle 42 is provided with a ball 51 which engages a partible socket 52 mounted on the longitudinal center line of the carriage 53.

The carriage 53 is provided adjacent its ends with the rollers 54, mounted on horizontal axes and running on the horizontal web of the channel rail 5. The carriage is also provided adjacent its ends with other rollers 55 mounted on vertical axes and engaging the adjacent vertical surfaces or flanges of the rail 5.

56 represents a stand or support extending up from the carriage 53 and of substantially inverted L-shape, its horizontal upper end overlying the upper end of the spindle 42, the outer end thereof being bifurcated and provided with vertical aligned bearing holes for a vertical pin shaft 57 upon which is fixed a roller 58 within the bifurcation. The shaft is provided with an enlarged head to hold it against vertical movement.

59 is a plate detachably and adjustably secured to the underside of the stand as by means of the tap bolts 60, 61 and 62 which are screwed into threaded holes in said plate and also extend through holes in the stand, which latter holes are elongated transversely of the latter. Thus by loosening the bolts and shifting the plate horizontally the position of the plate in a plane transversely of the bed of the machine may be adjusted. Again the plate may be adjusted arcuately to a degree. The outer edge of the plate 59 is provided with an upwardly extending flange 63 provided with threaded holes through which abutment bolts 64 are screwed, said bolts impinging against the edge of the stand 56, so that by screwing in said bolts the plate 59 may be moved relative to the stand away from the reentrant wall of the housing. Again arcuate movement of the plate may be thus effected. When the abutment bolts are slacked up the tension of the belt will move the plate in the opposite direction. The abutment bolts are provided with locknuts 65.

The plate 59 is provided with a hole 66 which is elongated longitudinally of the track and the upper end of the spindle 42 is provided with opposite flattened surfaces so that the spindle, the upper end of which fits in said elongated hole, may be moved along the latter.

The upper end of the spindle 42 is also bifurcated transversely to its flattened surfaces. In the fork, so provided, is seated a loosely fitting screw nut 67 through which is screwed a threaded shaft 68 which extends through loosely fitting bores in the spindle and has its ends journaled in bearings in the lugs 69 depending from plate 59 and wherein the shaft is held against longitudinal movement.

Thus by shifting the plate 59 transversely to the track and the upper spindle relative to the said plate in a direction parallel to the track, the spindle and the belt-pulley may be tilted from the vertical in any desired direction, or may be vertically alined, to provide proper engagement between the belt and the belt-pulley.

70 represents a rigid link, one of the ends of which is pivotally secured to the lower end of the bell crank frame while its other end extends through a vertically elongated opening in the wall of the support 6 and is pivotally connected to a horizontally disposed wrist pin 71 mounted in said support.

Thus the counterweight is coupled to the belt-pulley carriage so that the tension of the bell is assumed by the counterweight and slack in the belt is prevented.

72 represents a track member extending horizontally from the support 6 in the plane of the roller 58 and against the vertical surface of which the roller runs as the pulley carriage oscillates, thus furnishing adequate support for the upper end of the spindle 42 and for the belt-pulley and preventing the pulley from binding.

The track member is provided with a depending flange 73 and the plate 59 is provided with a hook extension 74 underlying said flange and arranged to engage the same to limit the possible movement of the upper end of the belt-pulley away from the track member.

I provide for adequate lubrication of the various moving parts of the machine. Thus I provide a tube 75 extending down through the top arm of the stand 56 and having its flexible lower portion connected to a radial port 76 in the spindle 42. The spindle is provided with an axial passage 77 which connects the port 76 to the radial ports 78 and 79, the first supplying lubricant to the top bearing assembly 43 while the second admits lubricant to the hub 40 wherein it travels downwardly to the lower bearing assembly 44. Like lubricant ducts 80 lead to the rollers 54 and 55. A duct 81 leads to the wrist pin 71.

Again the hub 20 is provided with a radial oiling part 82 upon which is mounted the force feed fitting 83, from which fitting leads a tube 84 which supplies oil to the bearing between the bell crank frame 21 and the link 70.

By the application of this invention I have increased the strength of a belt tightener for band wheel power set-ups by providing rigid supports for the bearings at both ends of the vertical spindle upon which is mounted the idler belt pulley. The increased rigidity of this belt tightener thus provides a mechanism for taking up the slack of a belt in a power transmission system for pumping wells, which system has been developed to operate at increased capacity for deep well pumping.

The horizontal component of the force exerted on the pulley greatly exceeds that of any vertical component which may be due to the pulsating transmission of the load through the twisted belt. However, the small vertical force may be directed downwardly which tends to keep the pulley carriage in the track. The resultant horizontal force, which comprises the imperial force to be counteracted, may be divided into two components in ninety degree phase relation with each other, one being parallel to the direction of movement of the belt past the mechanism and the other normal thereto. The center of pressure of these forces is effective against the running center of the belt on the surface of the pulley.

The force component which is parallel with the run of the belt is the one counteracted by the counterweight 32, as previously described. The force normal to the run of the belt is transmitted to and through the rollers 55 and 58 to the track surfaces 5 and 72 respectively. The reactive forces acting against the forces imposed on both of these track surfaces are transmitted from the foundation of the mechanism. The lower track being in close proximity with the foundation can adequately take care of its portion of the normal thrust component. The upper track is carried by the counterbalance support 6 which is designed to oppose the upper portion of the normal thrust through its angularly disposed member or box housing, which is adjustably secured to the foundation of the mechanism remote of the lower track. Thus the reactive force transmitted by the support 6 is in angular relation to the force applied through the roller 58 on the upper track 72, and the advantage gained by the horizontal component of this angular reactive force is determined by the proximity of the base member 2 from the vertical flange of the rail 5 which is in the same vertical plane as the rail 72.

By utilizing these advantages I am enabled to employ a comparatively light box frame design for the counterbalance support 6 wherein the forces are transmitted susbtantially in phase with the plane of strongest rigidity of the walls of the support. This provides rigidity to the operation of the belt tightener mechanism at a marked economic advantage, as well as a mechanical advantage.

I claim:

1. A belt tightener mechanism comprising in combination a base, a carriage mounted on said base and movable therealong, an idler pulley vertically mounted on said carriage, a counterweight supporting structure independently mounted on said base, a counter-weight device on said supporting structure, operative connection between the counterweight device and the carriage for urging said pulley against the run of a belt, and means forming a part of said mechanism for absorbing the lateral thrust of the belt from the pulley to prevent said pulley from canting and thereby cause binding in the mechanism.

2. A belt tightener mechanism comprising in combination a base, a carriage mounted on said base and movable therealong, an idler pulley vertically mounted on said carriage, a counterweight supporting structure independently mounted on said base, a counterweight device on said supporting structure, operative connection between the counterweight device and the carriage for urging said pulley against the run of a belt, and means forming a part of said counterweight supporting structure for absorbing the lateral thrust of the belt from the carriage to prevent the pulley from canting, and thereby cause binding in the mechanism.

3. A belt tightener mechanism comprising in combination, a base, a carriage mounted on said base and movable therealong, a vertically disposed idler pulley having both ends of its axial member mounted on said carriage, a counterweight supporting structure independently mounted on said base and adjustable therealong, a counterweight device on said supporting structure, operative connection between the counterweight device and the carriage for urging said pulley against the run of a belt, and a rail surface on said counterweight supporting structure for absorbing the lateral thrust of the belt from the upper end of the carriage to prevent the pulley from canting and thereby cause binding in the mechanism.

4. A belt tightener mechanism comprising in combination a base, a carriage mounted on said base and movable therealong, an idler pulley vertically mounted on said carriage, a counterweight supporting structure independently mounted on said base, a counterweight device on said supporting structure, operative connection between the counterweight device and the carriage for urging said pulley against the run of a belt, means for adjusting said pulley in all directions relative to the vertical to accommodate the run of the belt, and means forming a part of said mechanism for absorbing the lateral thrust of the belt from the pulley to prevent said pulley from canting and thereby cause binding in the mechanism.

5. In a belt tightener, the combination of a base comprising a channel rail and a pair of spaced apart rails all of which are in parallelism, a carriage having a substantially vertically disposed pulley with both ends supported thereby, antifrictional means arranged to ride on the bottom of the channel rail to support the vertical load of the carriage, antifrictional means arranged to ride on the sides of the channel track to support the horizontal thrust from the lower end of the pulley, a second carriage adjustable along the spaced apart rails and arranged to carry a counterweight device for urging the pulley against the run of a belt, and antifrictional means arranged to support the horizontal thrust on the second carriage from the upper end of the pulley.

JOHN B. PICARD.